US009832812B2

(12) United States Patent
Sakai (10) Patent No.: US 9,832,812 B2
(45) Date of Patent: Nov. 28, 2017

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 14/766,969

(22) PCT Filed: Feb. 13, 2014

(86) PCT No.: PCT/JP2014/000744
§ 371 (c)(1),
(2) Date: Aug. 10, 2015

(87) PCT Pub. No.: WO2014/125824
PCT Pub. Date: Aug. 21, 2014

(65) Prior Publication Data
US 2015/0373777 A1 Dec. 24, 2015

(30) Foreign Application Priority Data
Feb. 15, 2013 (JP) ................................ 2013-027839

(51) Int. Cl.
*H04W 76/06* (2009.01)
*H04W 8/00* (2009.01)
(Continued)

(52) U.S. Cl.
CPC ......... *H04W 76/068* (2013.01); *H04W 8/005* (2013.01); *H04W 8/186* (2013.01);
(Continued)

(58) Field of Classification Search
CPC ..... H04W 8/005; H04W 8/186; H04W 12/04; H04W 12/06; H04W 12/08; H04W 12/10; H04W 12/12; H04W 84/12; H04W 84/20
See application file for complete search history.

(56) References Cited

U.S. PATENT DOCUMENTS

2011/0007723 A1\* 1/2011 Shichino .......... H04N 21/43615
370/338
2011/0280152 A1 11/2011 Saito
(Continued)

FOREIGN PATENT DOCUMENTS

JP 2009-225061 A 10/2009
JP 2012-217049 A 11/2012
(Continued)

*Primary Examiner* — Edan Orgad
*Assistant Examiner* — Saumit Shah
(74) *Attorney, Agent, or Firm* — Canon U.S.A., Inc. IP Division (57) ABSTRACT

A communication apparatus includes a determination unit configured to determine whether the communication apparatus has joined a wireless network established with another communication apparatus prior to start of a predetermined service, and a leaving unit configured to perform processing for leaving the wireless network according to a result of determination by the determination unit when the predetermined service ends.

12 Claims, 6 Drawing Sheets

(51) Int. Cl.
*H04W 8/18* (2009.01)
*H04W 84/12* (2009.01)
*H04W 84/20* (2009.01)
*H04W 12/04* (2009.01)
*H04W 12/06* (2009.01)

(52) U.S. Cl.
CPC ............ *H04W 12/04* (2013.01); *H04W 12/06* (2013.01); *H04W 84/12* (2013.01); *H04W 84/20* (2013.01)

(56) References Cited

U.S. PATENT DOCUMENTS

2012/0252412 A1* 10/2012 Kimura .................. H04L 63/08
455/411
2012/0322391 A1* 12/2012 Suzuki .................. H04W 12/06
455/68

FOREIGN PATENT DOCUMENTS

| JP | 2013-005095 A | 1/2013 |
| WO | 2012/117306 A1 | 9/2012 |

* cited by examiner

COMMUNICATION APPARATUS, METHOD FOR CONTROLLING COMMUNICATION APPARATUS, AND PROGRAM

TECHNICAL FIELD

The present invention relates to a communication apparatus for performing communication via a wireless network.

BACKGROUND ART

Wi-Fi Alliance has defined Wi-Fi Direct (registered trademark) (U.S. Patent Application Publication No. US 2011/0280152). In the standard, for example, when a digital camera and a printer cooperate with each other to provide services (for example, image sharing, and printing) for users, both of the digital camera and the printer join a wireless network (Wi-Fi Direct network) established with Wi-Fi Direct to implement the service communication.

When the service communication is implemented using the Wi-Fi Direct network, if a Wi-Fi Direct network has not been established between the apparatus and the other apparatus, a new Wi-Fi Direct network is established between the apparatus and the other apparatus to implement the service communication. On the other hand, if a Wi-Fi Direct network has already been established between the apparatus and the other apparatus, the service communication is implemented using the Wi-Fi Direct network.

When the Wi-Fi Direct network is established to carry out predetermined service communication, the wireless network is not expected to be used for any other communication. Consequently, if the Wi-Fi Direct network is not ended when the service communication ends, the resources of the apparatuses are unnecessarily consumed.

Meanwhile, when service communication is to be implemented using an existing Wi-Fi Direct network, it is highly possible that any other communication has already been carried out over the wireless network. In such a case, if the wireless network is ended when the service communication ends, it is not possible to continue the other service communication. Consequently, for the other service communication, the Wi-Fi Direct network is required to be established again, and unfortunately, the usability is decreased.

SUMMARY OF INVENTION

The present invention is directed to a communication apparatus capable of appropriately leaving the Wi-Fi Direct network being used for service communication or continuing the participation in the Wi-Fi Direct network depending the circumstances.

According to an aspect of the present invention, a communication apparatus includes a determination means for determining whether the communication apparatus has joined a wireless network established with another communication apparatus prior to start of a predetermined service, and a leaving means for performing processing for leaving the wireless network according to a result of determination by the determination means when the predetermined service ends.

Further features of the present invention will become apparent from the following description of exemplary embodiments with reference to the attached drawings.

DESCRIPTION OF EMBODIMENTS

Figure 1:
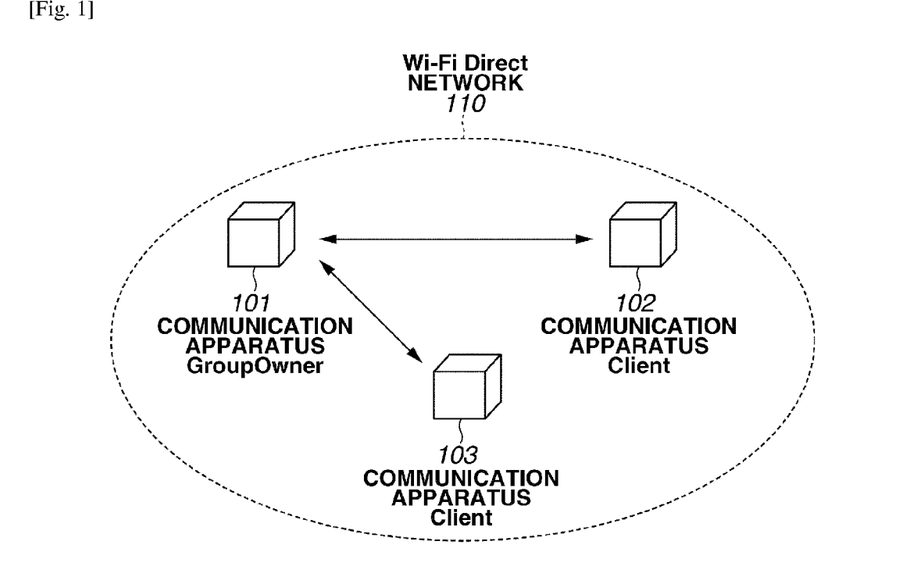
FIG. 1 illustrates a network configuration.

FIG. 1 illustrates a network configuration of a communication system according to an exemplary embodiment of the present invention.

A communication apparatus 101 operates as a Group Owner (hereinafter, referred to as GO) defined in Wi-Fi Direct. The GO is a base station that operates like an access point defined in the Institute of Electrical and Electronics Engineers (IEEE) 802.11 series.

Communication apparatuses 102 and 103 operate as Clients defined in Wi-Fi Direct. The Client is a terminal that operates like a station defined in the IEEE 802.11 series.

Each of the communication apparatuses 101 to 103 joins a wireless network 110, and communicates with each other. The wireless network 110 is a Wi-Fi Direct network established by the operations of the communication apparatuses 101 to 103 each complying with Wi-Fi Direct. Each of the communication apparatuses 101 to 103 can be various apparatuses such as a printer, a digital camera, a storage, a personal computer (PC), and a server.

Figure 2:
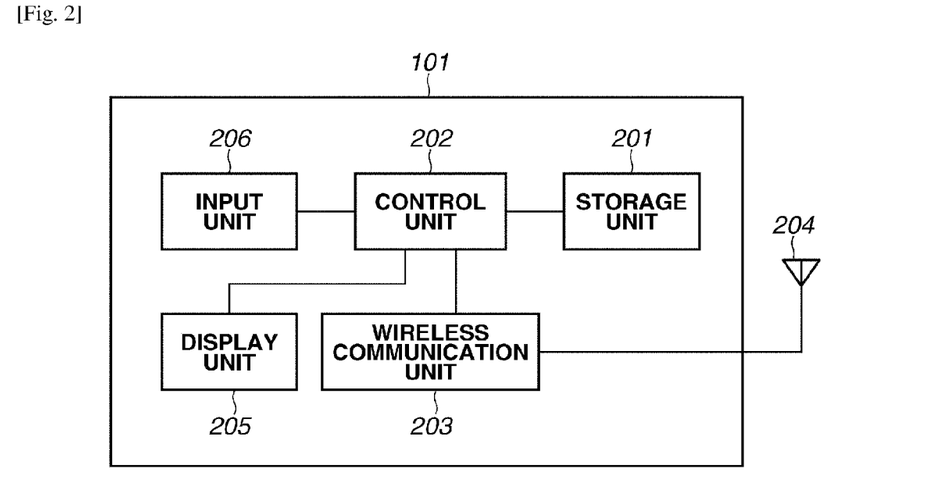
FIG. 2 illustrates a hardware configuration.

FIG. 2 illustrates a hardware configuration of the communication apparatus 101. Note that one block illustrated in FIG. 2 can be implemented by a plurality of blocks, or a plurality of blocks illustrated in FIG. 2 can be implemented by one block.

A storage unit 201 includes a memory, for example, a read-only memory (ROM) or a random access memory (RAM). The storage unit 201 stores a program for performing various operations described below, and various kinds of information such as communication parameters. As the storage unit 201, in addition to the memories such as the ROM and RAM, a storage medium such as a flexible disk, a hard disk, an optical disk, a magneto-optical disk, a compact disc read-only memory (CD-ROM), a compact disc recordable (CD-R), a magnetic tape, a nonvolatile memory card, and a digital versatile disc (DVD) may be used. A control unit 202 can be a computer such as a central processing unit (CPU) and a micro processing unit (MPU). The control unit 202 performs overall control of the communication apparatus 101 by executing a program stored in the storage unit 201. The overall control of the communication apparatus 101 can be performed in cooperation with an operating system (OS) executed by the control unit 202.

A wireless communication unit 203 controls an antenna 204 to perform wireless communication with another communication apparatus (for example, the communication apparatus 102 or the communication apparatus 103). A display unit 205 includes a liquid crystal display (LCD) or a light-emitting diode (LED) display, and provides information to users. The display unit 205 according to the present exemplary embodiment is, for example, a speaker for providing information to users by voice, or a vibrator for providing information to users by vibration, as well as the LCD and the LED. An input unit 206 receives various operations from users. The display unit 205 and the input unit 206 can be integrated into a user interface (UI), for example, like a touch panel display.

The hardware configurations of the communication apparatuses 102 and 103 are similar to that of the communication apparatus 101, and consequently, its description is omitted.

Figure 3:
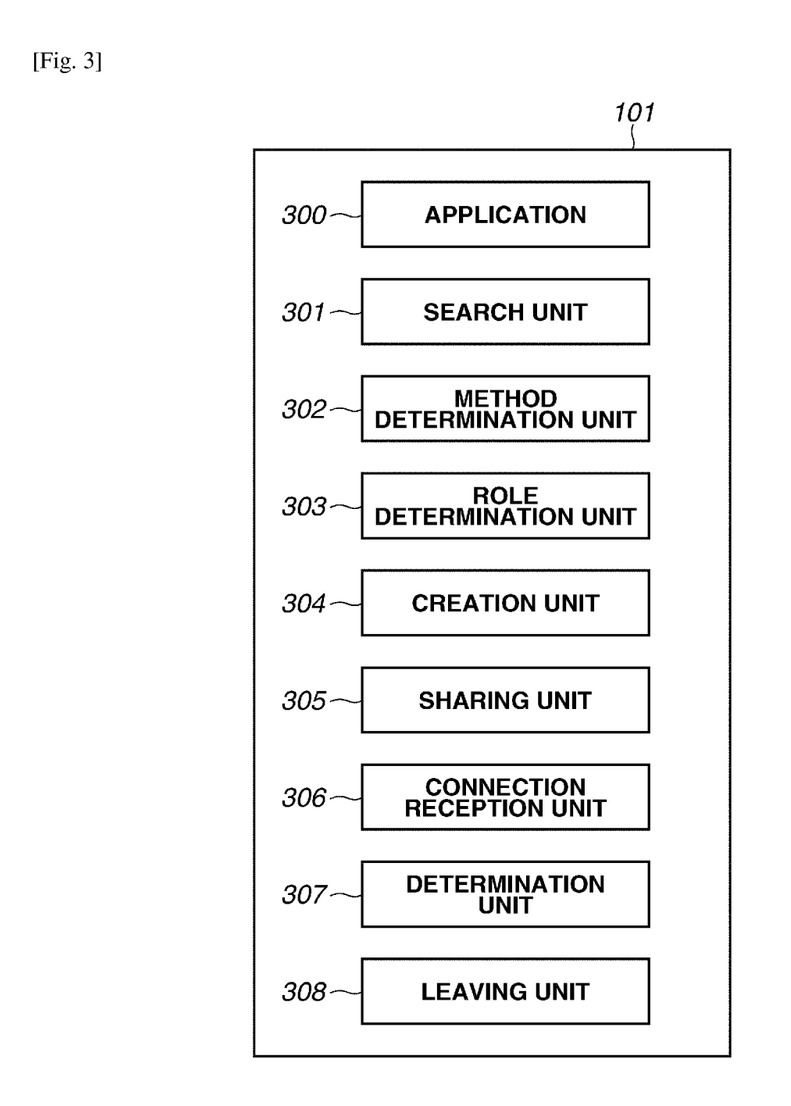
FIG. 3 illustrates a software function block diagram.

FIG. 3 illustrates software blocks to be implemented by the control unit 202 reading a program stored in the storage unit 201. Note that one block illustrated in FIG. 3 can be implemented by a plurality of blocks, or a plurality of blocks illustrated in FIG. 3 can be implemented by one block. Alternatively, a part or all of the blocks can be implemented as hardware.

An application 300 communicates with another communication apparatus (for example, the communication apparatus 102) via the Wi-Fi Direct network 110 to perform a predetermined service. In the present exemplary embodiment, it is assumed that the application 300 provides a service for sharing image data, however, it is not limited to the service. For example, the application 300 can provide an image output (print or display) service.

A search unit 301 searches for other communication apparatuses and detects them. Specifically, the search unit 301 sends a Probe Request that is a search signal for searching for other communication apparatuses, and receives a Probe Response that is a response signal of the search signal to detect the other communication apparatuses. More specifically, the search unit 301 refers to a Peer-to-Peer Information Element (P2P IE) defined in Wi-Fi Direct in the Probe Response to detect the other communication apparatuses corresponding to Wi-Fi Direct.

A method determination unit 302, which is a first determination unit, determines a method (sharing method) for performing sharing processing of parameters (communication parameters) used in wireless communication between communication apparatuses. The communication parameters include a service set identifier (SSID) that is identification information about the network, information about an encryption key and an encryption method to be used for the communication with the other communication apparatus, and information about an authentication method.

In the present exemplary embodiment, the communication apparatuses use a protocol compliant with Wi-Fi Protected Setup (WPS) (trademark) defined by the Wi-Fi Alliance to perform the communication parameter sharing processing. In WPS, the Personal Identification Number (PIN) method, the Push Button Configuration (PBC) method, and the Near Field Communication (NFC) method are defined. In the PIN method, based on a password (PIN) input or displayed in both apparatuses, authentication is performed to authenticate each other thereby sharing communication parameters. In the PBC method, communication parameters are shared among apparatuses on which a button operation is performed within a predetermined period of time. In the NFC method, communication parameters are shared using NFC communication.

In the present exemplary embodiment, the method determination unit 302 determines which method is to be used to perform the communication parameter sharing processing from the PIN method, the PBC method, and the NFC method defined in WPS. When the method determination unit 302 determines to perform the communication parameter sharing processing by the PIN method, the method determination unit 302 also determines whether the apparatus is to input PIN via the input unit 206, or is to output the PIN on the display unit 205 to urge the other apparatus to input the PIN.

Specifically, the method determination unit 302 sends a Provision Discovery Request that is a method notification signal for notifying the other communication apparatus of a sharing method (for example, the PBC method) preset in the communication apparatus 101. The other communication apparatus receives the Provision Discovery Request to determine whether to perform the communication parameter sharing processing by the notified sharing method. If the other communication apparatus agrees to perform the communication parameter sharing processing by the notified sharing method, the apparatus sends a Provision Discovery Response that is a response signal including the information about the sharing method to the communication apparatus 101. The method determination unit 302 receives the Provision Discovery Response to determine the sharing method.

A role determination unit 303, which is a second determination unit, determines whether the communication apparatus 101 operates as a GO or a Client defined in Wi-Fi Direct. In other words, the role determination unit 303 determines the role of the communication apparatus 101.

Specifically, the method determination unit 302 sends a GO Negotiation Request that is a priority notification signal for notifying the other communication apparatus of an intent value indicating the priority given to the communication apparatus 101 to act as a GO. The other communication apparatus receives the GO Negotiation Request, and sends a GO Negotiation Response that is a response signal of the GO Negotiation Request, the response including an intent value indicating the priority given to the other communication apparatus to act as a GO. The role determination unit 303 compares the intent value of the communication apparatus 101 with the intent value of the other communication apparatus, and determines the apparatus having a larger value to act as a GO. If the intent values of the two apparatuses are the same, the role determination unit 303 randomly determines the apparatus to act as a GO. The apparatus that has not determined to act as a GO is determined to act as a Client.

A creation unit 304 creates a Wi-Fi Direct network 110. A sharing unit 305 shares communication parameters with the other communication apparatus according to the sharing method determined by the method determination unit 302. A connection reception unit 306 receives a connection request from the other communication apparatus.

Figure 4:
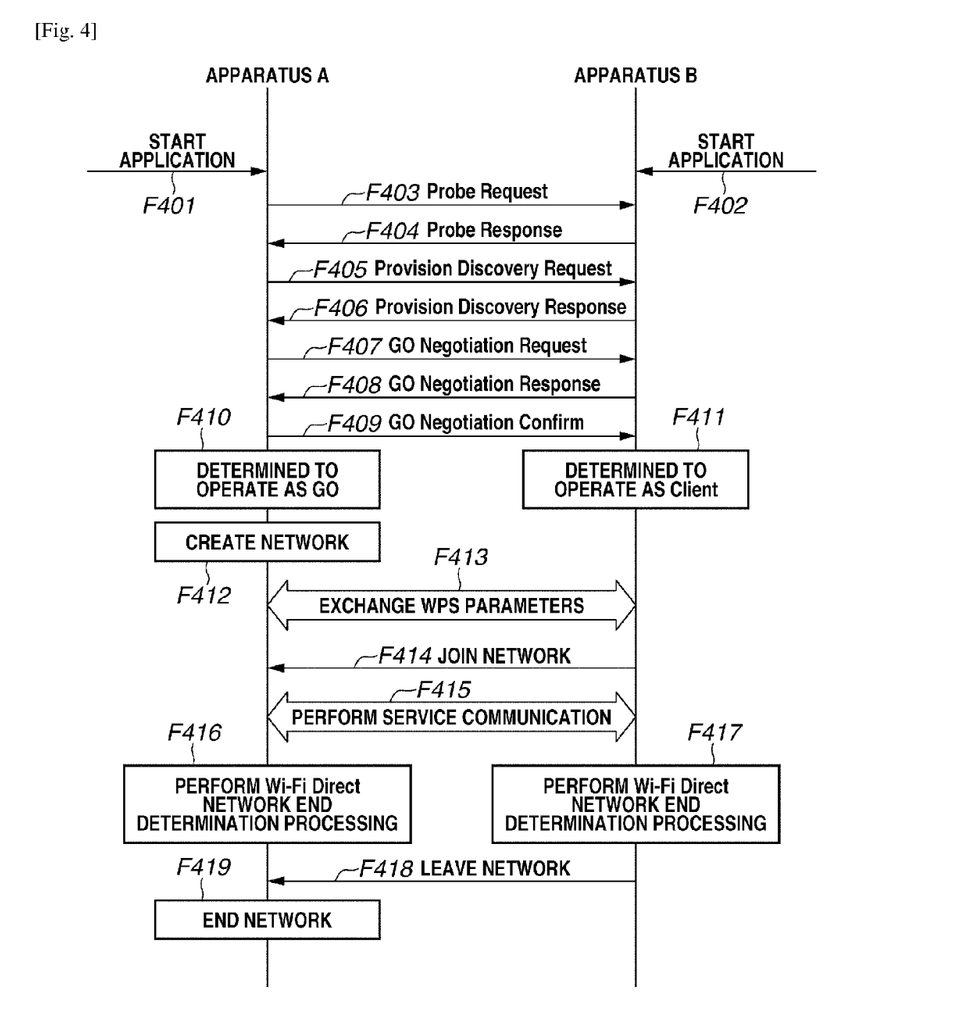
FIG. 4 is a sequence chart according to an exemplary embodiment of the present invention.
Figure 7:
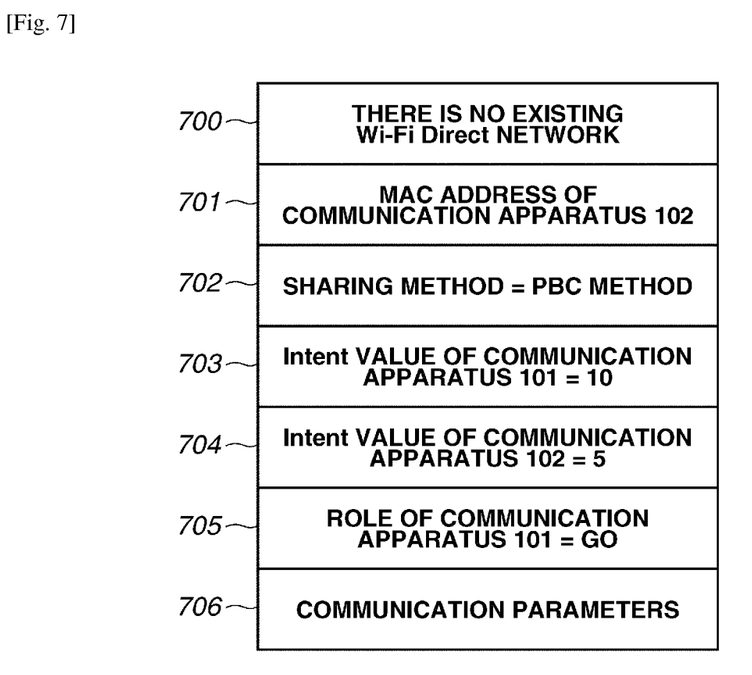
FIG. 7 illustrates a memory content of a storage unit.

FIG. 4 is a sequence chart illustrating processing to be performed when the application 300 newly establishes a Wi-Fi Direct network. FIG. 7 illustrates an example of a memory content stored in the storage unit 201.

Figure 5:
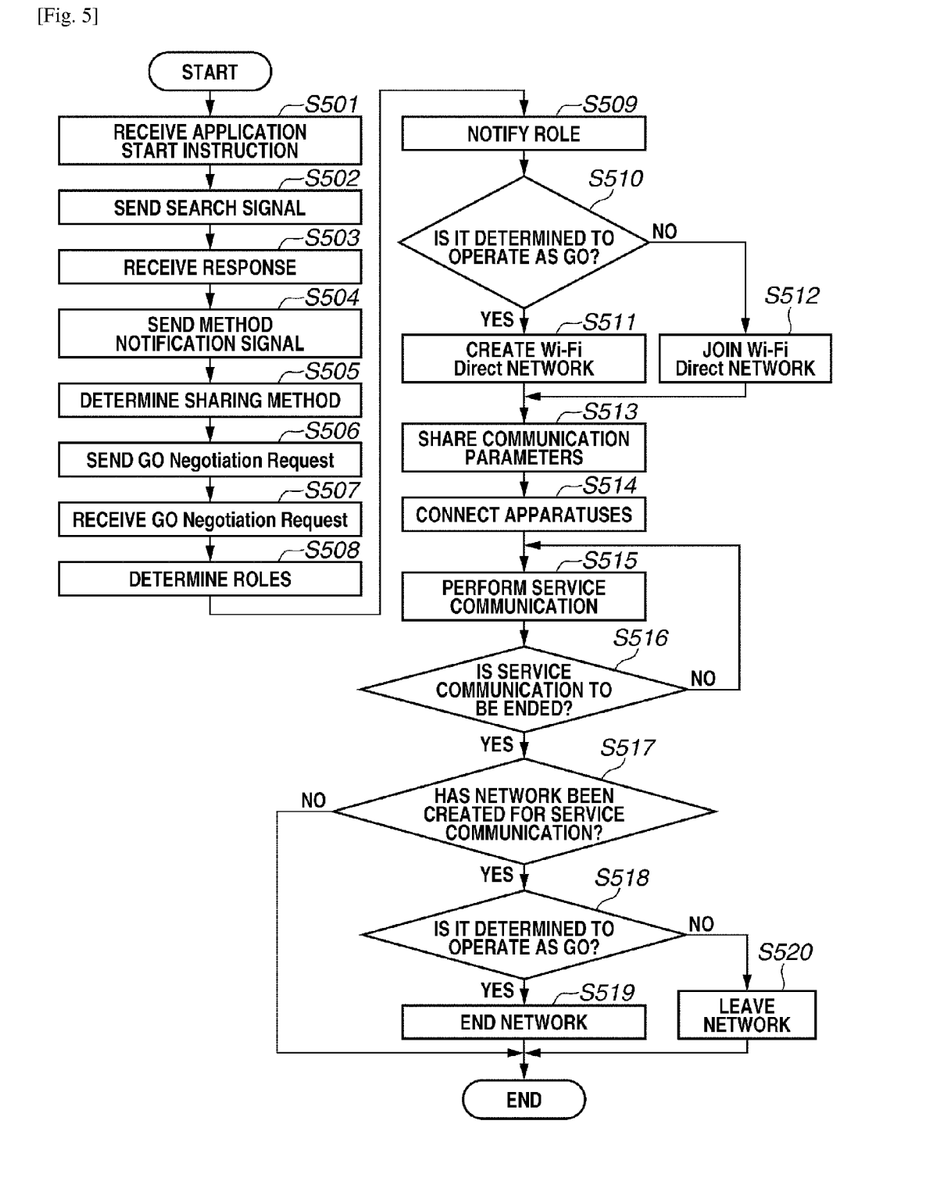
FIG. 5 is a flowchart illustrating processing to be implemented by a communication apparatus.

FIG. 5 is a flowchart illustrating processing to be executed, when the application 300 starts, by the control unit 202 in the communication apparatus 101 reading a program stored in the storage unit 201.

In steps F401 and S501, the communication apparatus 101 receives an instruction to start the application 300 from a user via the input unit 206 in the communication apparatus 101. In this processing, a determination unit 307 determines whether there is no existing Wi-Fi Direct network, and instructs the storage unit 201 to store the determination result (information 700 in FIG. 7). The application 300 communicates with another communication apparatus (for example, the communication apparatus 102) via the Wi-Fi Direct network 110 to perform the predetermined service.

Meanwhile, in step F402, the communication apparatus 102 receives an instruction to start the application 300 from a user.

In steps F403 and S502, in response to the instruction to start the application 300, the search unit 301 sends a Probe Request that is a search signal. In step F404, the communication apparatus 102, in this description, receives the Probe Request sent from the search unit 301, and sends a Probe Response that is a response signal of the search signal.

In step S503, the search unit 301 detects the communication apparatus 102 by receiving the Probe Response from the communication apparatus 102. The storage unit 201 stores a media access control (MAC) address of the communication apparatus 102 included in the Probe Response (MAC address 701).

In steps F405 and S504, the method determination unit 302 sends a Provision Discovery Request that is a method notification signal for notifying a communication parameter sharing method. The Provision Discovery Request is sent to the MAC address 701 of the communication apparatus 102 stored in the storage unit 201. In this description, the PBC method in WPS is notified as the communication parameter sharing method. The communication apparatus 102 that has received the Provision Discovery Request agrees to the communication parameter sharing processing by the PBC method. In step F406, the communication apparatus 102 sends a Provision Discovery Response that is a response signal of the method notification signal, the response including the information about the PBC method. In step S505, the method determination unit 302 receives the Provision Discovery Response from the communication apparatus 102 to determine the PBC method as the communication parameter sharing method. The storage unit 201 stores that the communication parameter sharing method is the PBC method (sharing method 702).

In steps F407 and S506, the role determination unit 303 sends a GO Negotiation Request including an intent value of the communication apparatus 101 to the communication apparatus 102. In the present exemplary embodiment, the intent value of the communication apparatus 101 is 10, and the value is stored in the storage unit 201 in advance (intent value 703). In step F408, the communication apparatus 102 that has received the GO Negotiation Request sends a GO Negotiation Response that is a response signal. In step S507, the role determination unit 303 receives the GO Negotiation Response from the communication apparatus 102. In the present exemplary embodiment, the GO Negotiation Response includes the intent value of 5 of the communication apparatus 102 (intent value 704). The storage unit 201 stores the intent value of the communication apparatus 102.

In step S508, the role determination unit 303 determines the communication apparatus 101 to act as a GO, and the communication apparatus 102 to act as a Client based on the intent value of 10 of the communication apparatus 101 and the intent value of 5 of the communication apparatus 102. The comparison is performed by reading and comparing the intent values 703 and 704 stored in the storage unit 201. The storage unit 201 stores the role of the communication apparatus 101 (whether to act as a GO or a Client) (information 705). In response to the determination of the roles (GO and Client) of the communication apparatuses 101 and 102, in steps F409 and S509, the role determination unit 303 sends a GO Negotiation Confirmation for notifying the communication apparatus 102 of the determined role.

By the above-described processing, it is determined that the communication apparatus 101 is to operate as a GO (step F410), and the communication apparatus 102 is to operate as a Client (step F411).

If it is determined that the communication apparatus 101 is to operate as a GO (YES in step S510), in steps F412 and S511, the creation unit 304 creates the Wi-Fi Direct network 110. If it is determined that the communication apparatus 101 is to operate as a Client (NO in step S510), in step S512, the communication apparatus 101 joins the Wi-Fi Direct network created by the communication apparatus 102 that has determined to act as a GO.

In steps F413 and S513, the sharing unit 305 shares the communication parameters with the communication apparatus 102 according to the sharing method determined by the method determination unit 302. In this description, according to the PBC method in WPS, the sharing unit 305 shares the communication parameters with the communication apparatus 102. The storage unit 201 stores the shared communication parameters (communication parameters 706).

After the communication parameter sharing, in step F414, the connection reception unit 306 receives a connection request from the communication apparatus 102, and in step S514, the communication apparatus 101 and the communication apparatus 102 communicate with each other. In this description, the connection request is an Association Request defined in IEEE 802.11. In response to the connection of the communication apparatus 101 and the communication apparatus 102 via the Wi-Fi Direct network 110, in steps F415 and S515, the application 300 performs service communication for implementing the predetermined service.

Hereinafter, a case where the application 300 is ended (YES in step S516) is described. In step S517, for the execution of the service communication of the application 300, the determination unit 307 determines whether a Wi-Fi Direct network has been established with the communication apparatus 102. Specifically, the determination unit 307 determines whether a Wi-Fi Direct network has been established after the instruction to start the application 300 had been received from the user in step F401. In other words, the determination unit 307 determines whether a Wi-Fi Direct network has already been established prior to the reception of the instruction to start the application 300 from the user in step F401. The determination is performed based on the information 700 stored in the storage unit 201, the information indicating whether there is an existing Wi-Fi Direct network.

If the Wi-Fi Direct network has been established not for the application 300 to perform the service communication (NO in step S517), the processing illustrated in FIG. 5 ends. Meanwhile, if the Wi-Fi Direct network has been established for the application 300 to perform the service communication (YES in step S517), in step S518, the role determination unit 303 determines whether the role of the communication apparatus 101 is GO or Client. The determination is performed based on the information 705 stored in the storage unit 201, the information indicating the role of the communication apparatus 101.

As a result of the determination, if the role of the communication apparatus 101 is GO (YES in step S518), in step S519, a leaving unit 308 ends the Wi-Fi Direct network created by the creation unit 304. Consequently, the communication apparatus 101 leaves the Wi-Fi Direct network created by the communication apparatus 101 itself. If the role of the communication apparatus 101 is Client (NO in step S518), in step S520, the leaving unit 308 causes the communication apparatus 101 to leave the Wi-Fi Direct network in which the communication apparatus 101 is currently participating. In other words, the leaving from the Wi-Fi Direct network can be considered as disconnection of the communication apparatus 101 and the communication apparatus 102 in the wireless layer (the physical layer in the Open Systems Interconnection (OSI) reference model).

In the above-described exemplary embodiment, since the communication apparatus 102 is operating as a Client, in step F418, a leaving unit (not illustrated) in the communication apparatus 102 causes the communication apparatus 102 to leave the Wi-Fi Direct network. Meanwhile, since the communication apparatus 101 is operating as a GO, in step F419, the communication apparatus 101 ends the Wi-Fi Direct network created by the creation unit 304, and leaves the network.

Figure 6:
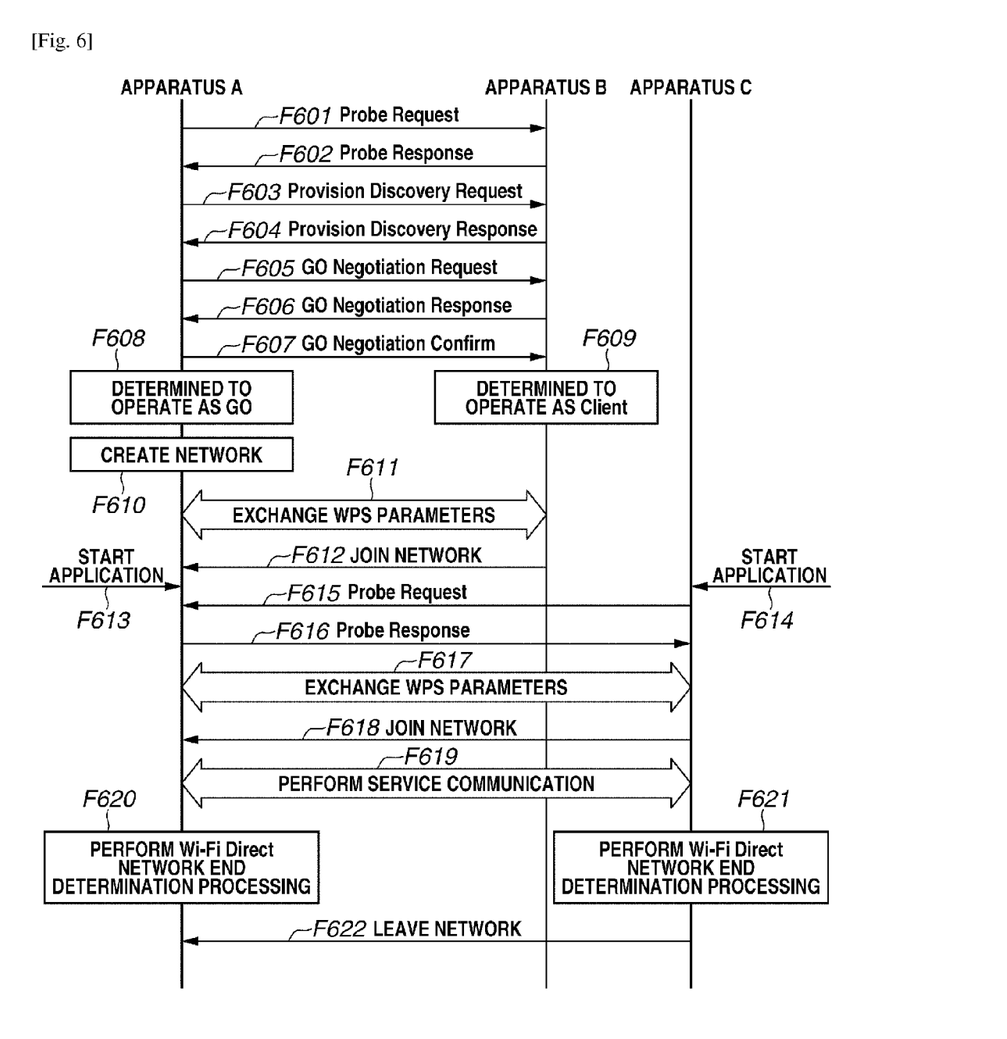
FIG. 6 is a sequence chart according to the present exemplary embodiment.

With reference to FIG. 6, a description is given of a case where service communication is performed via a Wi-Fi Direct network that has already been established prior to the reception of an instruction to start the application 300 from a user. In this description, it is assumed that the service communication is performed between the communication apparatuses 101 and 103.

By each of steps F601 to F612, the Wi-Fi Direct network 101 is established between the communication apparatuses 101 and 102. Steps F601 to F612 are similar to steps F403 to F414 in FIG. 4, and consequently, their descriptions are omitted.

In a state where the Wi-Fi Direct network 110 has already been established between the communication apparatuses 101 and 102, in step F613, the input unit 206 receives an instruction to start the application 300 from a user. In step F614, an input unit (not illustrated) in the communication apparatus 103 receives an instruction to start the application 300 from a user.

In step F615, in response to the instruction to start the application 300, the search unit 301 sends a Probe Request that is a search signal. In step F616, the search unit 301 receives a Probe Response that is a response signal from the communication apparatus 103. In this state, as the communication apparatus 101 has already joined the Wi-Fi Direct network 110, in step F617, the sharing unit 305 performs communication parameter sharing processing with the communication apparatus 103 to cause the communication apparatus 103 to join the network. After the communication parameter sharing processing, in step F618, the connection reception unit 306 receives a connection request from the communication apparatus 103. In response to the connection of the communication apparatus 101 and the communication apparatus 103 via the Wi-Fi Direct network 110, in step F619, the application 300 performs the service communication for implementing the predetermined service.

A case where the application 300 is ended is described. In the sequence illustrated in FIG. 6, the Wi-Fi Direct network has been established not for the application 300 to perform the service communication. Consequently, the determination unit 307 determines to be NO in step S517, and ends the processing illustrated in FIG. 5. In other words, the communication apparatus 101 is not made to leave the network by the leaving unit 308.

Meanwhile, in the communication apparatus 103, the Wi-Fi Direct network 110 has been established (in this case, the communication apparatus 103 has joined the network) to perform the service communication. Consequently, in step F622, when the application 300 ends, the communication apparatus 103 leaves the network.

In the case where the network 110 has been established not for the application 300 to perform the service communication (NO in step S517), if there is no application that performs communication using the network 110, the communication apparatus can leave the network 110. By the processing, the apparatus 101 can avoid continuing participation in the network that is not used for communication, and this reduces the processing load and power consumption.

As described above, when the service ends, the communication apparatus leaves the Wi-Fi Direct network depending on whether the communication apparatus has joined the Wi-Fi Direct network prior to the start of the predetermined service.

This enables the communication apparatus to appropriately leave or join the Wi-Fi Direct network used for service communication depending on the circumstances. This leads to less possibility of unnecessary increase in the processing load and power consumption in the communication apparatus. Further, the usability of the users can be enhanced.

In the above-described exemplary embodiment, whether a Wi-Fi Direct network has been established for the service communication is determined, and depending on the determination result, the communication apparatus automatically leaves the Wi-Fi Direct network. Alternatively, when it is determined that the Wi-Fi Direct network has been established for the service communication (YES in step S517 in FIG. 5), a notification of the determination can be sent to the user to ask whether the communication apparatus is to leave the wireless network. Further, if the user does not reply to the inquiry for a predetermined period of time (for example, three minutes), the apparatus can be configured to automatically leave the wireless network.

By this processing, it can be prevented that the communication apparatus leaves the wireless network without the user's intent, and the possibility of unnecessary increase in the processing load and power consumption of the communication apparatus can be reduced.

Further, in the above-described exemplary embodiment, when the application 300 ends, whether the Wi-Fi Direct network has been established for the service communication is determined. Alternatively, when the application 300 is temporarily suspended, whether the Wi-Fi Direct network has been established for the service communication can be determined. Alternatively, when the predetermined service is printing service, for example, upon completion of the printing, whether the Wi-Fi Direct network has been established for the service communication is determined, and depending on the determination result, the communication apparatus can leave the network. This is because the temporary suspension and the completion of the service such as printing can be considered as completion of a predetermined service (for example, print service). This also enables reduction in the possibility of the unnecessary increase in the processing load and power consumption of the communication apparatus while service communication is not performed.

The present invention has several effects of the above-described one or a plurality of effects.

According to the exemplary embodiments of the present invention, a communication apparatus can appropriately leave a Wi-Fi Direct network or continue the participation in the Wi-Fi Direct network used for service communication depending on the circumstances. Consequently, the possibility of unnecessarily increase in the processing load and power consumption in the communication apparatus can be reduced.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-027839 filed Feb. 15, 2013, which is hereby incorporated by reference herein in its entirety.

The invention claimed is:

1. A communication apparatus comprising:
one or more processors; and
one or more memories including instructions that, when executed by the processor(s), cause the communication apparatus to:
establish a wireless network compliant with Wi-Fi Direct standard with another communication apparatus; and
determine whether the communication apparatus has established the wireless network prior to start of a predetermined service,
1) wherein, in a case where it is determined that the communication apparatus has established the wireless network prior to the start of the predetermined service, processing for leaving the wireless network is not performed when the predetermined service ends, and
2) wherein, in a case where it is determined that the communication apparatus has not established the wireless network prior to the start of the predetermined service, processing for leaving the wireless network is performed when the predetermined service ends.

2. The communication apparatus according to claim 1, wherein the instructions, when executed by the processor(s), further cause the communication apparatus to search for another communication apparatus.

3. The communication apparatus according to claim 2, wherein the searching further comprises sending a search signal and receiving a response signal corresponding to the search signal to detect the other communication apparatus.

4. The communication apparatus according to claim 1, wherein the instructions, when executed by the processor(s), further cause the communication apparatus to determine a sharing method for performing processing for sharing communication parameters to be used for communication with the other communication apparatus.

5. The communication apparatus according to claim 4, wherein the determining further comprises determining whether to share the communication parameters by a Personal Identification Number method, by a Push Button Configuration method, or by a Near Field Communication method defined in Wi-Fi Protected Setup.

6. The communication apparatus according to claim 4, wherein the instructions, when executed by the processor(s), further cause the communication apparatus to share the communication parameters with the other communication apparatus.

7. The communication apparatus according to claim 4, wherein the communication parameters include identification information about the network, information about encryption to be used for the communication with the other communication apparatus, and information about authentication.

8. The communication apparatus according to claim 1, wherein the instructions, when executed by the processor(s), further cause the communication apparatus to determine whether the communication apparatus is to create a network.

9. The communication apparatus according to claim 8, wherein the determining whether the communication apparatus is to create a network further comprises determining whether the communication apparatus is to operate as a Group Owner or a Client defined in Wi-Fi Direct.

10. The communication apparatus according to claim 1, wherein, in a case where it is determined that the communication apparatus has not established the wireless network prior to the start of the predetermined service, the communication apparatus inquires of a user whether the communication apparatus is to leave the wireless network, and according to a reply to the inquiry from the user, causes the communication apparatus to leave the wireless network.

11. A method for controlling a communication apparatus, the method comprising:
establishing a wireless network compliant with Wi-Fi Direct standard with another communication apparatus; and
determining whether the communication apparatus has established the wireless network prior to start of a predetermined service,
1) wherein, in a case where it is determined that the communication apparatus has established the wireless network prior to the start of the predetermined service, processing for leaving the wireless network is not performed when the predetermined service ends, and
2) wherein, in a case where it is determined that the communication apparatus has not established the wireless network prior to the start of the predetermined service, processing for leaving the wireless network is performed when the predetermined service ends.

12. A non-transitory computer-readable storage medium storing computer executable instructions that cause a computer to execute a method for controlling a communication apparatus, the method comprising:
establishing a wireless network compliant with Wi-Fi Direct standard with another communication apparatus; and
determining whether the communication apparatus has established the wireless network prior to start of a predetermined service,
1) wherein, in a case where it is determined that the communication apparatus has established the wireless network prior to the start of the predetermined service, processing for leaving the wireless network is not performed when the predetermined service ends, and
2) wherein, in a case where it is determined that the communication apparatus has not established the wireless network prior to the start of the predetermined service, processing for leaving the wireless network is performed when the predetermined service ends.

* * * * *